United States Patent
Lu

(10) Patent No.: US 9,762,065 B2
(45) Date of Patent: Sep. 12, 2017

(54) METHOD AND DEVICE FOR CONTROLLING ELECTRONIC DEVICES

(71) Applicants: INVENTEC (PUDONG) TECHNOLOGY CORPORATION, Shanghai (CN); INVENTEC CORPORATION, Taipei (TW)

(72) Inventor: Chih-Kuo Lu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 235 days.

(21) Appl. No.: 14/677,417

(22) Filed: Apr. 2, 2015

(65) Prior Publication Data

US 2016/0043558 A1 Feb. 11, 2016

(30) Foreign Application Priority Data

Aug. 6, 2014 (CN) .......................... 2014 1 0384236

(51) Int. Cl.
*H02J 3/14* (2006.01)
*H02J 4/00* (2006.01)
*G08C 17/02* (2006.01)

(52) U.S. Cl.
CPC ................ *H02J 4/00* (2013.01); *G08C 17/02* (2013.01); *G08C 2201/00* (2013.01); *G08C 2201/51* (2013.01)

(58) Field of Classification Search
None
See application file for complete search history.

(56) References Cited

U.S. PATENT DOCUMENTS

| | | | |
|---|---|---|---|
| 8,299,954 B2 * | 10/2012 | Friedman | H04N 5/4403 340/12.22 |
| 8,700,101 B2 * | 4/2014 | Yamashita | H04M 1/0245 381/104 |
| 9,202,372 B2 * | 12/2015 | Reams | G08C 19/28 |
| 2010/0219948 A1 * | 9/2010 | Egawa | G08B 21/12 340/531 |
| 2013/0057765 A1 * | 3/2013 | Zeleznikar | H04N 21/42207 348/570 |
| 2014/0077775 A1 * | 3/2014 | Gotou | G01R 31/40 323/234 |
| 2014/0157147 A1 * | 6/2014 | Yang | G06Q 30/0631 715/751 |

(Continued)

*Primary Examiner* — Jared Fureman
*Assistant Examiner* — Esayas Yeshaw
(74) *Attorney, Agent, or Firm* — Huffman Law Group, PC

(57) ABSTRACT

The present invention provides a method and a device for controlling electronic devices. The method includes the following steps. According to a triggering signal, a first control signal is generated for controlling a first electronic device to execute a first action. After that, based on whether the first electronic device executes the first action, a first feedback signal is generated. When the first feedback signal indicates that the first electronic device executes the first action, a second control signal is generated for controlling a second electronic device to execute a second action. Therefore, the method and the device of the present invention provide interaction and simultaneous control between the device and a plurality of electronic devices.

7 Claims, 3 Drawing Sheets

(56) References Cited

U.S. PATENT DOCUMENTS

| | | | |
|---|---|---|---|
| 2014/0266791 A1* | 9/2014 | Lloyd | H04Q 9/00 340/870.09 |
| 2015/0012581 A1* | 1/2015 | Kim | H04W 4/005 709/201 |
| 2015/0033275 A1* | 1/2015 | Natani | H04N 21/42225 725/110 |
| 2015/0046559 A1* | 2/2015 | Shariff | H04W 4/206 709/217 |
| 2015/0371524 A1* | 12/2015 | Hung | H04M 1/72566 340/686.1 |

* cited by examiner

METHOD AND DEVICE FOR CONTROLLING ELECTRONIC DEVICES

CROSS-REFERENCE TO RELATED APPLICATIONS

This non-provisional application claims priority under 35 U.S.C. §119(a) on Patent Application No. 201410384236.X filed in China on Aug. 6, 2014, the entire contents of which are hereby incorporated by reference.

BACKGROUND OF THE INVENTION

Technical Field of the Invention

The present disclosure relates to a method and a device for controlling electronic devices, particularly to a method and a device for controlling electronic devices having bidirectional interaction and simultaneous control.

Description of the Related Art

Generally the scenario of controlling an electronic device is using a remote controller or a handheld device to control a single electronic device in a certain direction. For example, in the current families, most of us are using a remote controller to set up the air conditioner system and the remote controller is used to control the air conditioner system only. Besides, when the remote controller sends a command to the electronic device and the command is further executed by the electronic device, the remote controller cannot determine whether the command is executed or not because the electronic device does not send back a signal to the remote controller. Therefore, the problem created from the remote controller for controlling a single electronic device in a single transmitting direction is an urgent problem for controlling electronic devices.

Thus, in the industry, a method and a device for controlling electronic devices are needed for users to follow the ordinary habits to control electronic devices. Besides controlling multiple electronic devices, the device can further confirm the execution of the command sent to electronic devices according to the feedback signal transmitted from electronic devices.

SUMMARY OF THE INVENTION

The present invention discloses a method and a device for controlling electronic devices. The device can not only follow the users' ordinary habits to control electronic devices, but also have a bidirectional interaction function between the controlling device and the controlled devices. Moreover, the device can have simultaneous control to the controlled electronic devices.

The present invention provides a method for controlling electronic devices. The method has following steps: generating a first control signal according to a triggering signal, and the first control signal for controlling a first electronic device to execute a first action; detecting whether the first electronic device executes the first action after generating the first control signal, and generating a first feedback signal accordingly; and generating a second control signal when the first feedback signal indicates that the first electronic device executes the first action; when the first electronic device executes the first action, generating a second control signal to a second electronic device to execute a second action.

The present invention provides a device for controlling electronic devices, which comprises a receiving module, a controlling module, and a detecting module. The receiving module is for receiving a triggering signal. The controlling module, based on the triggering signal, is for generating a first control signal for controlling the first electronic device to execute the first action. The detecting module is for determining whether the first electronic device executes the first action, and generating a first feedback signal accordingly. When the first feedback signal indicates that the first electronic device executes the first action, the controlling module generates a second control signal for controlling a second electronic device to execute a second action.

In an embodiment of the present invention, the device further comprises an alarming module. When the first feedback signal generated by the detecting module indicates that the first electronic device does not execute the first action, the alarming module, based on the first feedback signal, generates a first alarm signal for alarming that the first electronic device does not execute the first action, and the controlling module generates a first control signal again. In another embodiment of the present invention, when the receiving module receives another trigging signal, the controlling module, based on the another trigging signal, generates a third control signal for controlling the first electronic device to execute the third action. When the first action has a conflict with the third action, the alarming module generates a second alarm signal for alarming the existence of the first action.

In conclusion, the method and the device for controlling electronic devices of the present invention can use the controlling module to have simultaneous control to electronic devices and have bidirectional interactions with electronic devices by detecting the generated feedback signals and determining the status of the controlled devices.

The contents of the present invention set forth and the embodiments hereinafter are for demonstrating and illustrating the spirit and principles of the present invention, and for providing further explanation of the claims.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
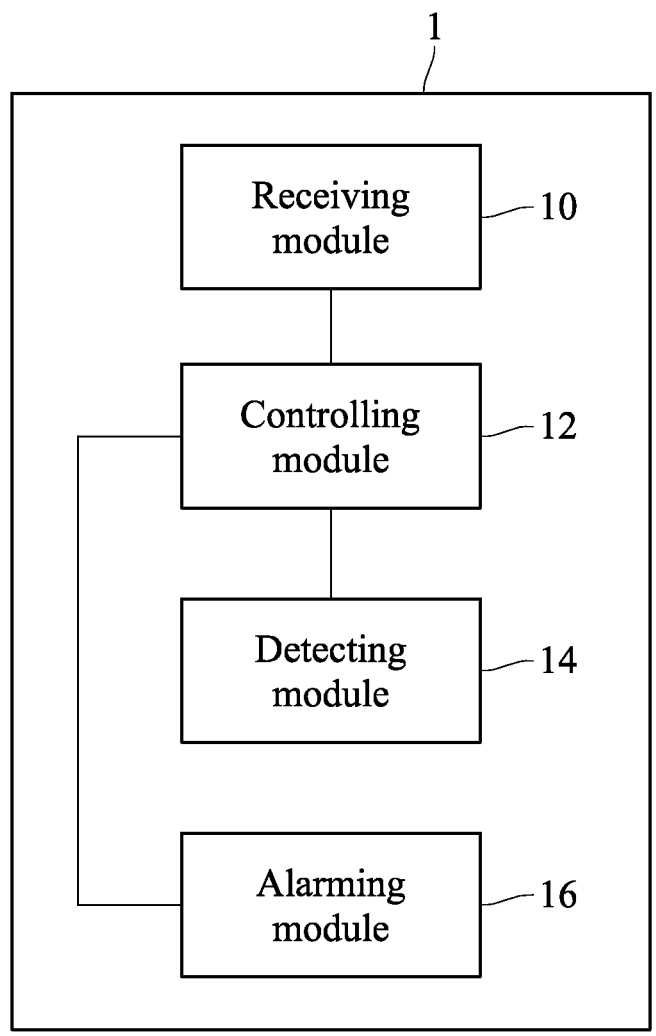
FIG. 1 is a functional block diagram of the device for controlling electronic devices according to an embodiment of the present invention.

Please refer to FIG. 1. FIG. 1 is a functional block diagram of the device for controlling electronic devices (described as the controlling device below) according to an embodiment of the present invention. As shown in FIG. 1, the controlling device 1 has a receiving module 10, a controlling module 12, and a detecting module 14. According to the said modules, the controlling device 1 can have simultaneous control to electronic devices and have a bidirectional interaction function. In an embodiment, the controlling device 1 further has an alarming module 16 for a more complete functionality. However, the present invention may not essentially include the alarming module 16. Person skilled in the art can add the said module selectively. Practically, the controlling device 1 may be a network device for users to conveniently operate the controlling device 1 to control multiple electronic devices through wireless network.

The receiving module 10 is for receiving a triggering signal. For example, the method of receiving a triggering signal may be through a touch panel disposed on the case of the controlling device 1, so that the receiving module 10 can receive a triggering signal. The receiving module 10 can also receive a triggering signal through a sensor of the controlling device 1, when the sensor detects the variation of the environment. For example, a thermometer is for measuring temperature variations, a camera is for capturing images, a microphone is for capturing the voice variations, or a clock is for setting the time of the controlling electronic device. Person skilled in the art may freely design the receiving method of the triggering signal of the receiving module 10. The embodiment does not make further explanations here.

The controlling module 12 can determine which electronic devices the triggering signal relates to through a built-in reference table or a signal processing method. Then a first control signal is generated to control a first electronic device to execute a first action. After the controlling module 12 generates the first control signal, the detecting module 14 detects whether the first electronic device executes the first action, and generates a first feedback signal. In an example, when the detecting module 14 detects whether the first electronic device executes the first action, the detection may be detecting whether the state of the first electronic device is changed (turned on or turned off), or detecting the variations of the environment, such as using a sensor installed on the air outlet to detect the air volume for confirming the ON/OFF state of the air conditioner, or using an ampere meter installed on the circuit to detect whether the electric current flows by the electronic devices for confirming the OPEN/CLOSE state of the circuit. Person skilled in the art may freely design the detecting module 14 for confirming whether the first electronic device executes the first action. The embodiment does not make further explanations here.

After the controlling module 12 receives the first feedback signal and determines that the first electronic device executes the first action, the controlling module 12 generates a second control signal for controlling the second electronic device to execute a second action. In the present invention, when the controlling device 1 is a network device, the controlling device 1 can transmit the controlling signals to the electronic devices through wireless transmission. Person skilled in the art may freely design the transmission method of the controlling module 12. The embodiment does not make further explanations here.

The following embodiment is an example of how the controlling device 1 of the present invention controls multiple electronic devices. In summer time, in order to save energy and reduce carbon emission, users may set up the electric fan to turn on at 0:00 AM. After the receiving module 10 receives a triggering signal, the controlling module 12 determines that the triggering signal is related to turning off the air conditioner and turning on the electric fan. Therefore, in the present embodiment, without limiting the order of controlling the air conditioner and the electric fan, the controlling module 12 first controls the air conditioner and then controls the electric fan. Next, at 0:00 AM, the controlling module 12 generates a first control signal to control the air conditioner (i.e. turn off the air conditioner). After the controlling module 12 generates the first control signal, the detecting module 14 uses an air volume sensor installed on the air outlet (not illustrated in the figure) to detect whether the air conditioner is turned off. When the air volume sensor does not detect any air volume, it means that the air conditioner is turned off. The detecting module 14 generates a first feedback signal accordingly. When the first feedback signal indicates that the air conditioner is turned off, the controlling module 12 accordingly generates a second control signal to control the state of the electric fan (i.e. turn on the electric fan). Therefore, users can set up once to control both of the air conditioner and the electric fan for simultaneous control of multiple electronic devices.

In another embodiment of the present invention, in order to ensure that the controlling device 1 can exactly control multiple electronic devices, after the controlling module 12 generates a second control signal, the detecting module 14 detects whether the second electronic device executes the second action and generates a second control signal accordingly. Therefore, after the controlling module 12 generates a second control signal to turn on the electric fan, the detecting module 14 uses an air volume sensor installed on the electric fan to detect the state of the electric fan and confirm whether the electric fan is turned on.

However, when the controlling module 12 determines that the first feedback signal indicates that the first electronic device does not execute the first action, the alarming module 16 generates a first alarm signal for alarming that the first electronic device does not execute the first action, and the controlling module 12 generates a first control signal again to make the first electronic device exactly execute the first action. The alarming module 16 may include but not limited to a ringing beeper or a flashing light. Therefore, the controlling device 1 can have bidirectional interactions with multiple electronic devices. Person skilled in the art may freely design the alarming method of the alarming module 16. The embodiment does not make further explanations here.

In another embodiment of the present invention, when the receiving module 10 receives a triggering signal, the controlling module 12 generates a first control signal accordingly to control the first electronic device to execute a first action. Then, the receiving module 10 receives another triggering signal and the controlling module 12 accordingly generates a third control signal for controlling the first electronic device to execute a third action, and then the controlling module 12 determines whether the first action has a conflict with the third action. When the first action has a conflict with the third action, the alarming module 16 accordingly generates a second alarm signal for alarming the existence of the first action.

For example, when a first user uses the controlling device 1 to enable the electric rice cooker for 90 minutes at 2 o'clock in the afternoon, and the receiving module 10 receives the first triggering signal of the time setup command, the controlling module 12 generates a first control signal to make the electric rice cooker execute the first action (i.e. enable the electric rice cooker for 90 minutes). Then, a second user, without knowing the previous settings, uses the controlling device 1 to turn off the electric rice cooker at 3 o'clock in the afternoon. After the receiving module 10 receives another triggering signal of turning off the electric rice cooker, the controlling module 12 generates a third control signal to make the electric rice cooker execute the third action (i.e. turn off the electric rice cooker). At this moment, the first control signal and the third control signal both indicate a controlling command to the electric rice cooker, so the controlling module 12 can use a built-in reference table to determine whether the first action has a conflict with the third action. Then the controlling module 12 uses the alarming module 16 to generates a second alarm signal to remind users of the existence of the first action and notify users whether to transmit a first control signal or a third control signal to the electric rice cooker for executing the first action or the third action. If the second user confirms the completion of the current cooking, then the electric rice cooker can execute the third action. If the second user confirms that the current cooking is not finished, then the electric rice cooker keeps executing the first action. The system can keep the operation flexibility thereby.

In order to explain the method for controlling electronic devices, the following description involves the controlling device of the present invention for clearer explanation.

Figure 2:
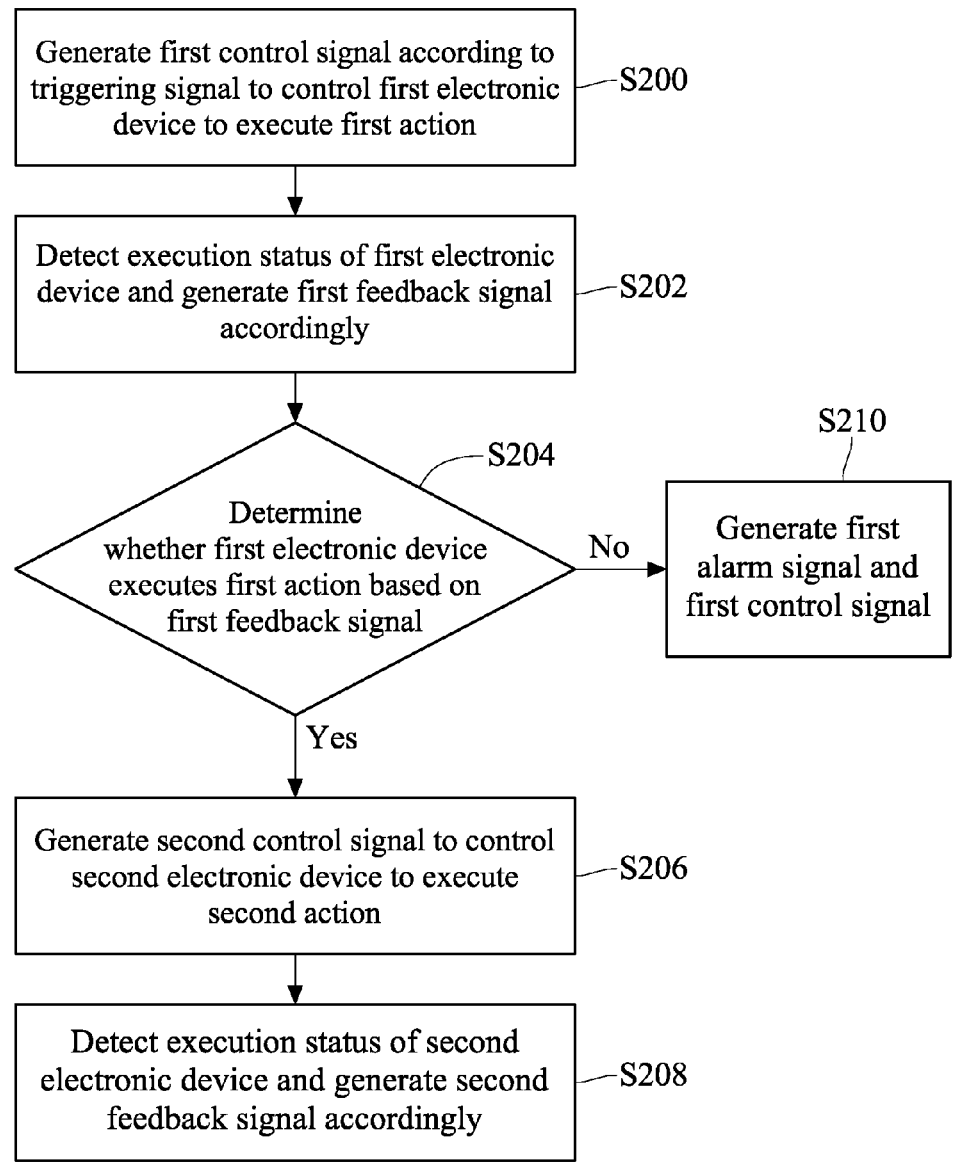
FIG. 2 is a flowchart of the method for controlling electronic devices according to an embodiment of the present invention.

Because the method for controlling electronic devices of the present invention is exactly disclosed in the previous embodiments, the method is further explained here with the controlling device of the present invention. Please refer to FIG. 2. FIG. 2 is a flowchart of the method for controlling electronic devices according to an embodiment of the present invention. As shown in FIG. 2, in the step S200, the receiving module 10 receives a triggering signal and the controlling module 12 generates a first control signal according to the triggering signal to control a first electronic device to execute a first action. In the step S202, the detecting module 14 detects the execution state of the first electronic device and generates a first feedback signal accordingly. In the step S204, based on the first feedback signal, the method determines whether the first electronic device executes the first action. In the step S206, because after the first electronic device executes the first action, the controlling module 12 generates a second control signal to control a second electronic device to execute a second action. In the step S208, the detecting module 14 detects the execution state of the second electronic device and generates a second control signal accordingly.

In another embodiment, when the first electronic device does not execute the first action, the method enters the step S210 and the alarming module 16 generates a first alarm signal and the controlling module 12 generates a first control signal.

Figure 3:
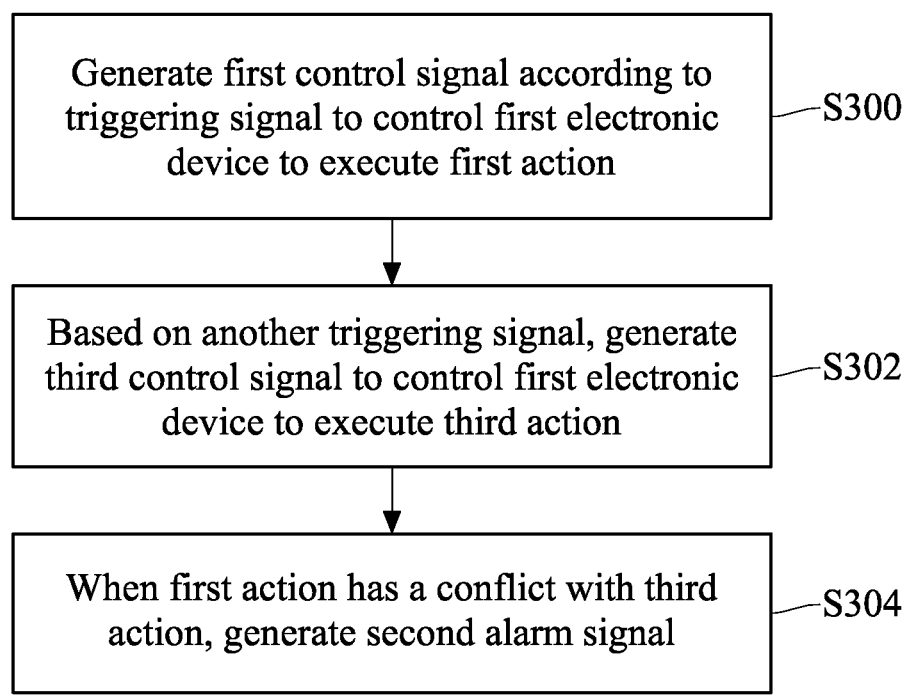
FIG. 3 is a flowchart of the method for controlling electronic devices according to another embodiment of the present invention.

In a further embodiment, because the method for controlling electronic devices of the present invention is exactly disclosed in the previous embodiments, the method is further explained here with the controlling device of the present invention. Please refer to FIG. 3. FIG. 3 is a flowchart of the method for controlling electronic devices according to another embodiment of the present invention. In the step S300, the receiving module 10 receives a triggering signal and according to the triggering signal, the controlling module 12 generates a first control signal to control the first electronic device to execute a first action. In the step S302, the receiving module 10 further receives another triggering signal and, according to the another triggering signal, generates a third control signal to control the first electronic device to execute a third action. In the step S304, when the first action has a conflict with the third action, the alarming module 16 generates a second alarm signal.

In conclusion, a method and a device for controlling electronic devices of the present invention are disclosed. The device comprises a receiving module, controlling module, and a detecting module. By using the receiving module to receive a triggering signal, the triggering signal can be related to multiple electronic devices. The controlling module, based on the triggering signal, generates a first control signal to control a first electronic device to execute a first action. After the controlling module generates the first control signal, the detecting module determines whether the first electronic device executes the first action, and generates a first feedback signal accordingly. When the first feedback signal indicates that first electronic device executes the first action, the controlling module generates a second control signal to control a second electronic device to execute a second action. By the said steps, the controlling device can have simultaneous control to multiple electronic devices and have bidirectional interactions with those electronic devices.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A method for controlling electronic devices, comprising:

generating a first control signal according to a triggering signal, and the first control signal for controlling a first electronic device to execute a first action;

detecting whether the first electronic device executes the first action after generating the first control signal, and generating a first feedback signal accordingly;

generating a second control signal when the first feedback signal indicates that the first electronic device executes the first action, and the second control signal for controlling a second electronic device to execute a second action; and wherein, based on another triggering signal, a third control signal is generated and the third control signal is for controlling the first electronic device to execute a third action, and when the first action has a conflict with the third action, a second alarm signal is generated and the second alarm signal is for alarming the existence of the first action.

2. The method for controlling electronic devices of claim 1, wherein after generating the second control signal, whether the second electronic device executes the second action is detected and a second feedback signal is generated accordingly.

3. The method for controlling electronic devices of claim 1, wherein when the first feedback signal indicates that the first electronic device does not execute the first action, a first alarm signal is generated and the first alarm signal is for alarming that the first electronic device does not execute the first action.

4. The method for controlling electronic devices of claim 3, wherein when the first feedback signal indicates that the first electronic device does not execute the first action, the first control signal is generated again.

5. A device for controlling electronic devices, comprising:
a receiving module for receiving a triggering signal;
a detecting module for detecting whether a first electronic device executes a first action, and generating a first feedback signal accordingly;
a controlling module, based on the triggering signal, for generating a first control signal for controlling the first electronic device to execute the first action, and generating a second control signal for controlling a second electronic device to execute a second action when the first feedback signal indicates that the first electronic device executes the first action;
wherein the detecting module determines whether the first electronic device executes the first action after the controlling module generates the first control signal; and
an alarming module for generating a first alarm signal when the first feedback signal indicates that the first electronic device does not execute the first action, and the first alarm signal for alarming that the first electronic device does not execute the first action, and the controlling module generating the first control signal;
wherein when the receiving module receives another triggering signal, the controlling module generates a third control signal based on the another triggering signal, and the third control signal is for controlling the first electronic device to execute a third action.

6. The device for controlling electronic devices of claim 5, wherein the detecting module is for detecting whether the second electronic device executes the second action, and generating a second feedback signal.

7. The device for controlling electronic devices of claim 5, wherein when the first action has a conflict with the third action, the alarming module is for generating a second alarm signal, and the second alarm signal is for alarming the existence of the first action.

* * * * *